No. 768,317. PATENTED AUG. 23, 1904.
J. L. SMITH.
POTATO DROPPER.
APPLICATION FILED NOV. 20, 1903.
NO MODEL.
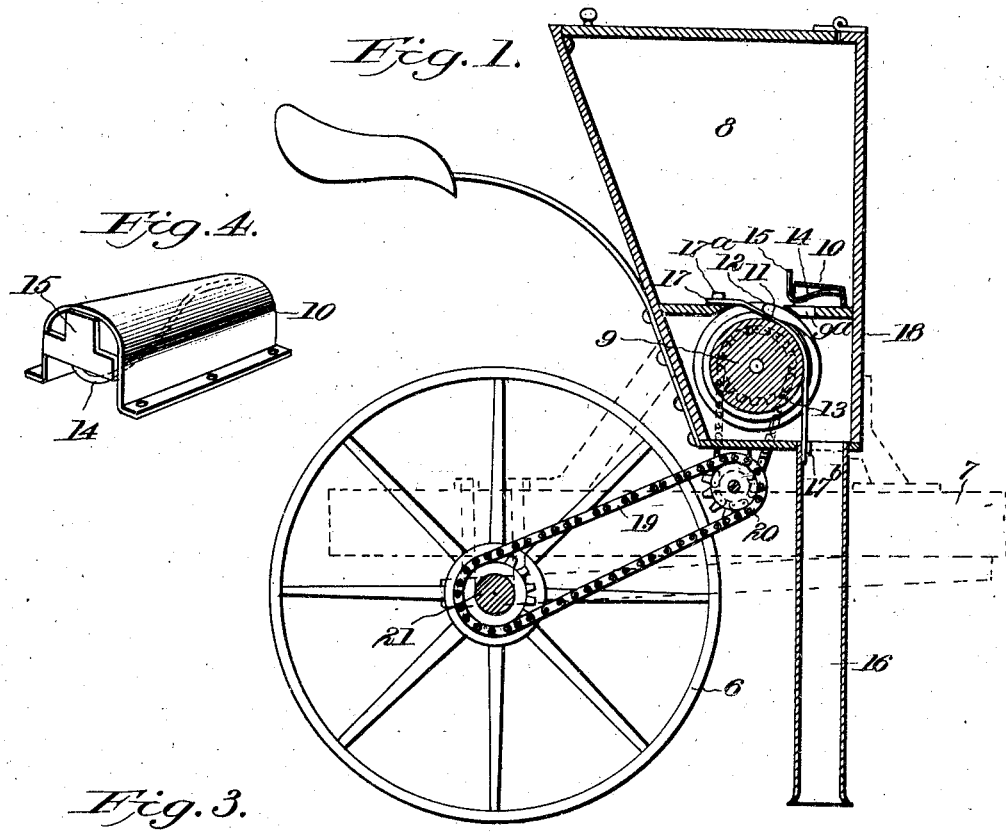
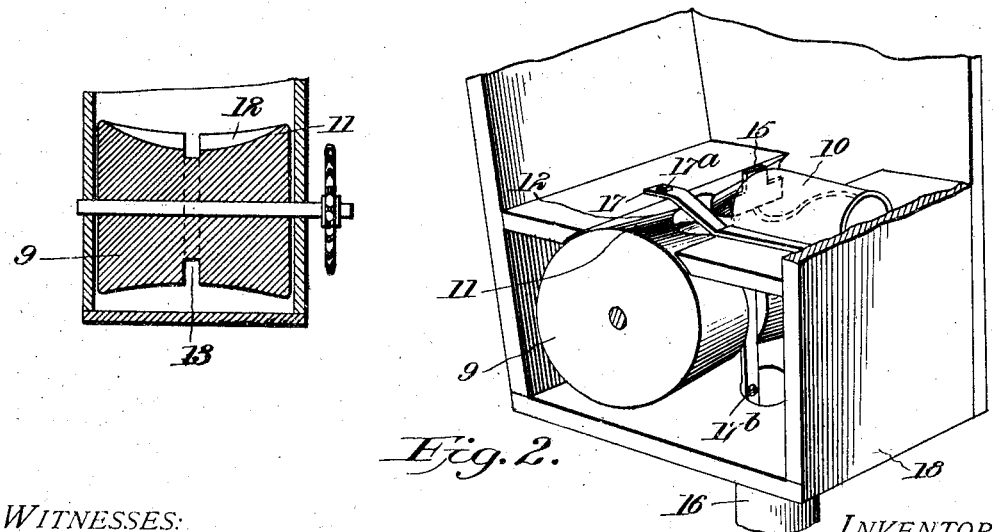
WITNESSES:
C. H. Walker.
Geo. E. Tem
INVENTOR
John L. Smith
BY
Milo B. Stevens & Co.
Attorneys No. 768,317.  
Patented August 23, 1904.

UNITED STATES PATENT OFFICE.

JOHN L. SMITH, OF THOMPSON, OHIO.

POTATO-DROPPER.

SPECIFICATION forming part of Letters Patent No. 768,317, dated August 23, 1904.

Application filed November 20, 1903. Serial No. 181,951. (No model.)

*To all whom it may concern:*

Be it known that I, JOHN L. SMITH, a citizen of the United States, residing at Thompson, in the county of Geauga and State of Ohio, have invented new and useful Improvements in Potato-Droppers, of which the following is a specification.

This invention relates to machines for dropping seed-potatoes; and the object of the invention is to improve the devices by which the potatoes or pieces thereof are taken from the hopper and dropped to the ground. It is characterized particularly by a rotating cylinder which works beneath an opening in the bottom of the hopper and which has an undercut groove forming a lip which, in connection with other devices, takes one potato or a piece thereof at each rotation and drops the same down the spout to the ground. Means are also provided for disengaging the potato from the cylinder at the proper time to fall through the spout.

The invention is illustrated in the accompanying drawings, in which—

Figure 1 is a central longitudinal vertical section. Fig. 2 is a fragmentary perspective view showing the bottom of the hopper and the feeding-cylinder. Fig. 3 is a vertical section through the cylinder in line with the axis thereof, and Fig. 4 is a detail in perspective of the spring and gate which controls the discharge-opening from the hopper.

Referring specifically to the drawings, the machine is supported upon wheels 6, the pole for the draft-animals being indicated at 7. The particular construction of the frame or platform of the machine is quite immaterial.

The hopper is indicated at 8 for containing the seed-potatoes, and in the bottom thereof is a transverse slot, the edges of which are properly curved to conform to the surface of the cylinder 9, which works thereunder. At the middle of the slot, on the forward side thereof, is an opening $9^a$, which is covered by a hood 10, and in operation the potatoes are carried through said opening, the hood serving to prevent the remaining potatoes in the hopper from falling therethrough. Extending lengthwise in the surface of the cylinder 9 is an undercut cavity or recess 11, forming a lip 12. This cavity inclines inwardly or increases in depth from each end toward the middle, so that at the ends of the cylinder the original contour is substantially preserved; but at the middle the cavity is of sufficient depth to receive a potato of the size appropriate for planting. Extending circumferentially around the cylinder, at the middle thereof, is a groove 13, and this groove is deeper than the cavity referred to and is of slight width—say about one-half an inch. Fixed to the top of the hood 10 within the same is one end of a spring 14, the other end of which is bent down to lie sufficiently close to the circumference of the cylinder, and upon its free end a gate 15 is carried, which works up and down in front of the mouth of the hood and serves to prevent the passage of any potatoes other than the one engaged by the lip 12. Below the cylinder is a discharge-spout 16, leading toward the ground, and to insure the discharge of the potatoes from the cavity to the spout a spring-strap 17 is bent partly around the cylinder, lying within the circumferential groove 13, heretofore referred to. This strap is fastened at one end, as at $17^a$, to the bottom of the hopper and at the other end, as at $17^b$, to the rear side of the mouth of the spout. When the potatoes are carried in the cavity, they are positioned directly above or outside the strap, and in case they stick, as sometimes happens with cut potatoes, the pieces are dislodged at the lower end of the strap, where it rises out of the groove, and when so dislodged fall into the spout 16. The surface of the cylinder inclines from each end toward the middle, so that as it rotates the tendency of the potatoes is to gravitate toward the groove. The cylinder and spout are supported by a suitable boxing 18 under the hopper, and the former is driven by a chain and sprocket-wheel connection, as indicated at 19 and 20, from the main shaft 21.

It is thought that the operation will be evident from the above description; but it may be shortly stated as follows: As the cylinder is rotated the potatoes fall or are fed into the cavity as it passes under the slot and opening and are forced under the spring 14 and gate 15, which yield, if necessary, to permit the passage of a single potato or piece thereof and which serve to prevent other pieces from following. After passing the opening in the hopper the potato is dropped into the spout 16. Should it stick to the surface of the cylinder, it is dislodged by the spring 17, as hereinbefore described. The rate of feed may be varied by variations in the speed in which the cylinder is driven, or one or more cavities may be added to the cylinder.

What I claim as new, and desire to secure by Letters Patent, is—

1. The combination with the hopper having an opening in the bottom thereof, of a hood over said opening, a spring-gate working at the front of the hood, over the opening, and a feeding device under the opening and constructed to take a potato and force it under the gate.

2. The combination with a hopper having a transverse opening in the bottom, of a cylinder rotatable under the opening and having a circumferential groove at the middle thereof, an undercut recess extending lengthwise across the cylinder and inclined from each end toward the groove forming forwardly-projecting lips, a delivery-spout under the cylinder, and a stationary strap in the groove, projecting beyond the surface of the cylinder at the mouth of the spout and arranged to dislodge the potato from the lips.

In testimony whereof I have signed my name to this specification in the presence of two subscribing witnesses.

JOHN L. SMITH.

Witnesses:
L. M. SMITH,
O. A. YOKOM.